(12) United States Patent
Dunko

(10) Patent No.: US 7,983,723 B2
(45) Date of Patent: Jul. 19, 2011

(54) CLOSED MODE USER INTERFACE FOR WIRELESS COMMUNICATION DEVICES

(75) Inventor: Gregory A. Dunko, Cary, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 1247 days.

(21) Appl. No.: 11/153,211

(22) Filed: Jun. 15, 2005

(65) Prior Publication Data

US 2006/0287015 A1 Dec. 21, 2006

(51) Int. Cl.
*H04M 1/00* (2006.01)
(52) U.S. Cl. ............ 455/575.4; 455/575.1; 455/575.3
(58) Field of Classification Search ............ 455/575.1, 455/575.3, 575.4
See application file for complete search history.

(56) References Cited

U.S. PATENT DOCUMENTS

| | | | |
|---|---|---|---|
| 5,987,336 A | 11/1999 | Sudo et al. | |
| 6,215,474 B1* | 4/2001 | Shah | 345/168 |
| 7,231,188 B2* | 6/2007 | Godston et al. | 455/73 |
| 7,321,789 B2* | 1/2008 | Ishihara et al. | 455/575.3 |
| 2005/0070343 A1 | 3/2005 | Janninck et al. | |
| 2006/0050855 A1* | 3/2006 | Chan et al. | 379/88.13 |
| 2006/0168539 A1* | 7/2006 | Hawkins et al. | 715/780 |
| 2006/0176278 A1* | 8/2006 | Mathews et al. | 345/168 |

FOREIGN PATENT DOCUMENTS

| | | |
|---|---|---|
| EP | 0679003 B1 | 4/1995 |
| EP | 1 631 045 | 3/2006 |
| JP | H07297891 A | 10/1995 |
| JP | A H09-321839 | 12/1997 |
| JP | A H10-164226 | 6/1998 |
| JP | A 2001-308970 | 11/2001 |
| JP | A 2002-171339 | 6/2002 |
| JP | 2005006219 A | 6/2005 |
| JP | A 2005-141541 | 6/2005 |
| WO | WO 00/57615 | 9/2000 |
| WO | WO 2004/040786 | 5/2004 |
| WO | WO 2005/009010 | 1/2005 |

OTHER PUBLICATIONS

PCT International Search Report, International Application No. PCT/US2006/005034, Mailed Jun. 9, 2006.

* cited by examiner

*Primary Examiner* — Tuan H Nguyen
(74) *Attorney, Agent, or Firm* — Coats & Bennett, P.L.L.C.

(57) ABSTRACT

A method and apparatus for providing an improved user interface for a wireless communication device is described herein. The wireless communication device comprises a main body including a first user interface, and a movable cover including a second user interface. When the movable cover is closed relative to the main body, the movable cover conceals at least a portion of the first user interface. To provide some of the functionality associated with the first user interface without having to open the movable cover, the present invention maps a soft key associated with the second user interface to a function assigned to a selected control or key of the first user interface.

14 Claims, 7 Drawing Sheets

CLOSED MODE USER INTERFACE FOR WIRELESS COMMUNICATION DEVICES

BACKGROUND OF THE INVENTION

The present invention generally relates to wireless communication devices, and more particularly to user interfaces for wireless communication devices.

As wireless communication devices evolve, manufacturers continue to develop different mechanical configurations to reduce the size of the devices. Some wireless communication devices comprise multiple-piece designs (a two-piece design, for example, having a main body and a movable cover), where the movable cover closes over the main body to reduce the size of the wireless communication device. Examples of two-piece designs include clam-shell, jack-knife, and slider-type wireless communication designs.

Most two-piece wireless communication designs include a user interface on the main body. However, when the movable cover is in a closed position relative to the main body, the movable cover conceals all or some of the user interface. To enable users to access some functions while the movable cover is closed, some two-piece wireless communication designs include a second user interface on the movable cover that is accessible when the movable cover is in the closed position. The second user interface typically includes fewer capabilities than the first user interface. For example, because the second interface does not include an alpha-numeric keypad, the user may not implement any functions or execute any commands requiring a keypad input while the movable cover is closed. As a result, the user must open the movable cover to access a desired feature or function.

BRIEF SUMMARY OF THE INVENTION

The present invention comprises a method and apparatus for providing an improved user interface for multi-piece wireless communication designs comprising a main body and a movable cover. The main body includes a first user interface, while the movable cover includes a second user interface. When the movable cover is in a closed position, the movable cover conceals at least a portion of the first user interface. However, the second user interface is accessible by the user when the movable cover is in the closed position. To provide some of the functionality associated with the first user interface without having to open the movable cover, the present invention maps a soft key of the second user interface to a function assigned to a selected control or key of the first user interface. As a result, a user may implement functions normally limited to the concealed first user interface without having to open the movable cover.

According to one exemplary embodiment, the wireless communication device may have different operating modes. For this embodiment, when the movable cover is closed, the wireless communication device may map the soft key to a particular function based on an identified operating mode. For example, in one exemplary application, the present invention may be implemented when the wireless communication device operates in a voicemail operating mode. While the movable cover is closed, the wireless communication device maps a soft key on the second interface to a voicemail function normally assigned to a selected key of the concealed first user interface. By activating the soft key, the user implements the desired voicemail function without opening the movable cover or directly accessing the first user interface.

To implement the present invention, the wireless communication device includes a mapping processor. When the movable cover is closed, the mapping processor maps a soft key to a function assigned to a selected key of the concealed first user interface. According to one exemplary embodiment, the wireless communication device may also include a mode processor configured to determine an operating mode of the wireless communication device. In this embodiment, the mapping processor maps the soft key to the appropriate function when the movable cover is in the closed position based on the operating mode determined by the mode processor.

According to another exemplary embodiment, the wireless communication device of the present invention maps the soft key on the movable cover user interface to a first function when the movable cover is closed, and therefore, conceals at least a portion of the main body user interface. When the movable cover is open, the wireless communication device maps the soft key on the movable cover user interface to a second function. As such, the present invention may also map a soft key to different functions based on the position of the movable cover relative to the main body.

DETAILED DESCRIPTION OF THE INVENTION

The present invention applies to any wireless communication device having a main body and a movable cover. As used herein, the term "wireless communication device" may include cellular telephones, satellite telephones, personal communication services (PCS) devices, personal data assistants (PDAs), palm-top computers, pagers, and the like.

Figure 1A:
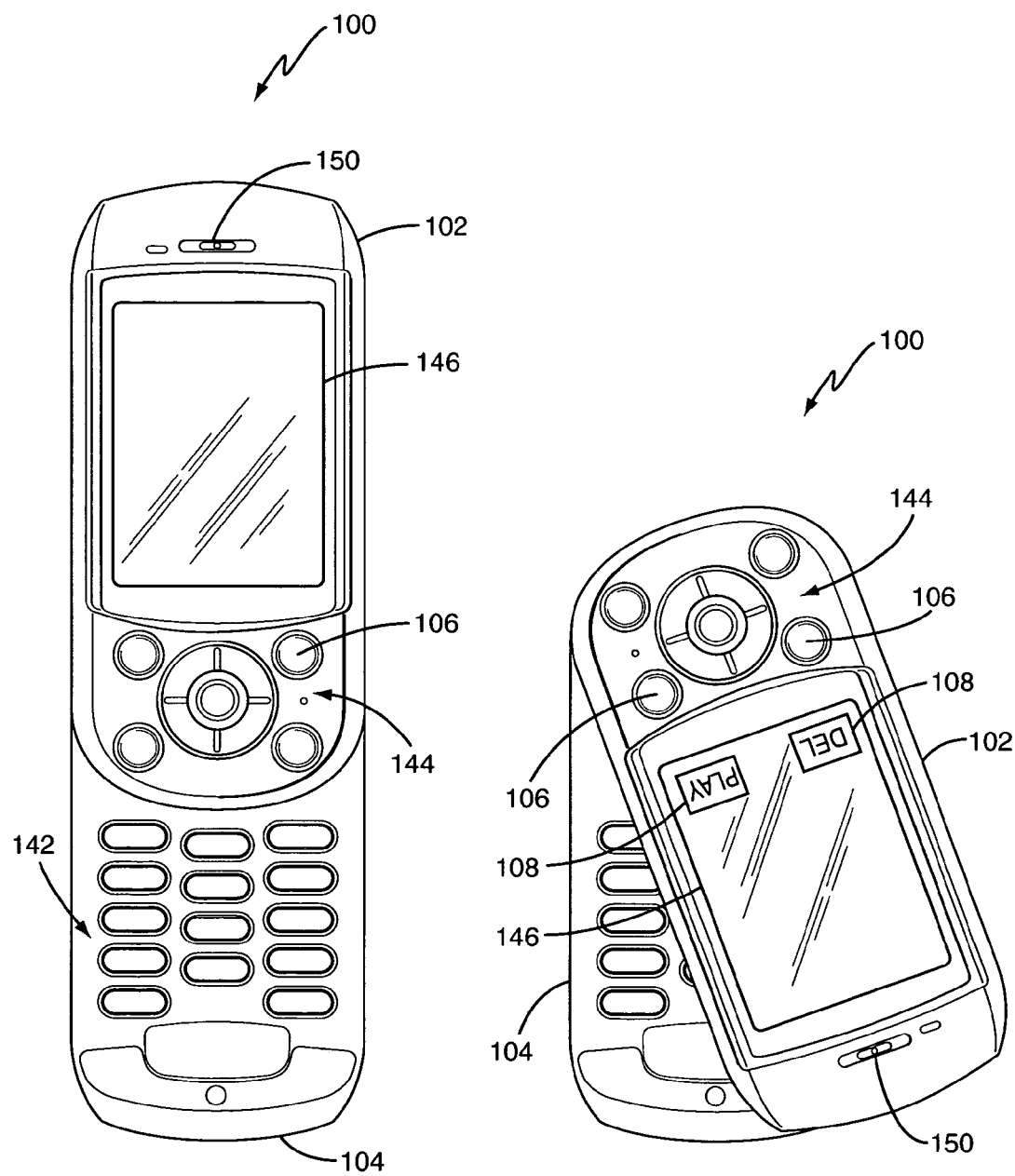
FIG. 1A illustrates a jack-knife type wireless communication device according to the present invention.
Figure 1B:
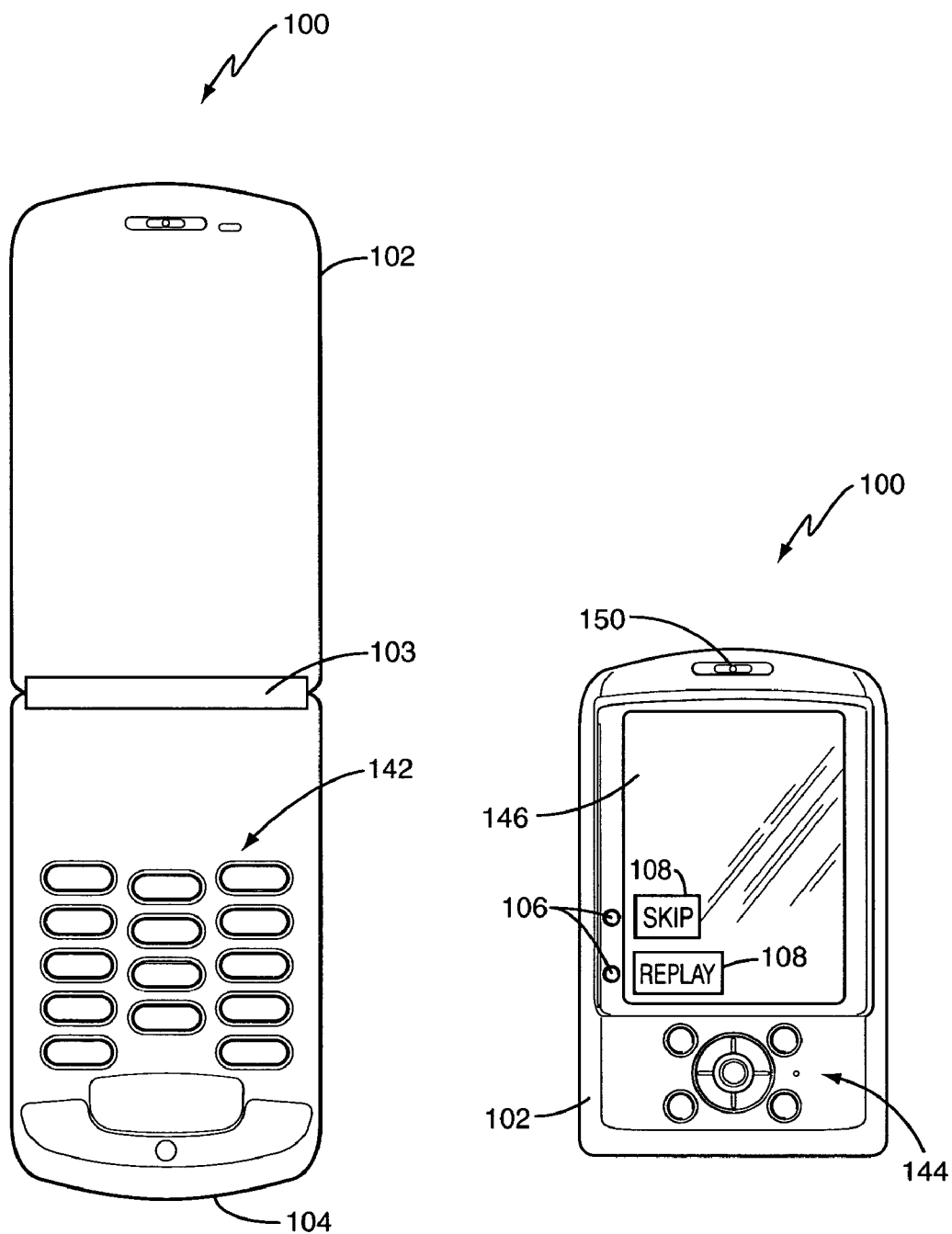
FIG. 1B illustrates a clamshell type wireless communication device according to the present invention.
Figure 1C:
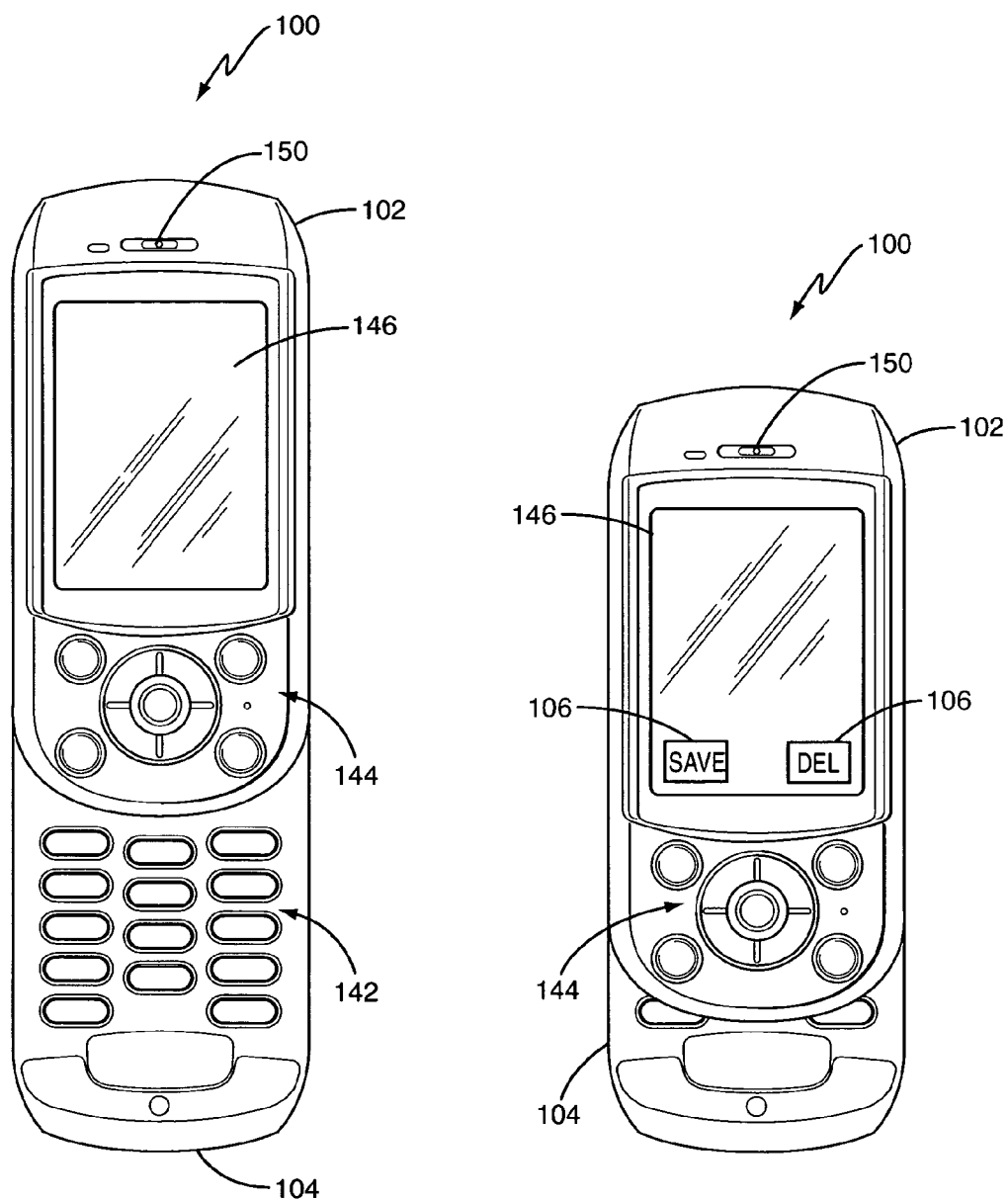
FIG. 1C illustrates a slider type wireless communication device according to the present invention.

FIGS. 1A-1C illustrate exemplary two-piece wireless communication devices 100. Each wireless communication device 100 includes a cover 102 that moves relative to a main body 104. Those skilled in the art will appreciate that the wireless communication devices 100 illustrated in FIGS. 1A-1C are for illustrative purposes only, and therefore, do not limit the present invention.

FIG. 1A represents a jack-knife wireless communication device 100. Jack-knife wireless communication devices 100 comprise a movable cover 102 pivotally connected to main body 104. The movable cover 102 opens and closes by rotating about a pivot point (not shown) in a clockwise or a counterclockwise direction relative to main body 104, as shown in FIG. 1A.

FIG. 1B illustrates a clamshell wireless communication device 100 comprising a movable cover 102 hingedly connected to main body 104 by a hinge mechanism 103. The user opens and closes the movable cover by rotating the movable cover 102 about hinge 103.

FIG. 1C illustrates a slider-type wireless communication device 100 comprising a movable cover 102 slidably connected to the main body 104. As illustrated in FIG. 1C, movable cover 102 slides up and down relative to main body 104. To open the movable cover 102, the user slides the movable cover 102 up relative to the main body 104; to close movable cover 102, the user slides the movable cover 102 down.

As illustrated in FIGS. 1A-1C, when movable cover 102 is in the open position (images on left side of FIGS. 1A-1C), a user has physical access to a primary interface 142 and a secondary interface 144, even if both interfaces 142, 144 are not enabled. However, when movable cover 102 is in the closed position (images on right side of FIGS. 1A-1C), the movable cover 102 conceals at least a portion of primary interface 142. As a result, to access functions controlled by primary user interface 142, the user must open movable cover 102. When the user has no need for the majority of the functions associated with the primary user interface 142, or when the user only briefly needs access to a particular control, this extra step may be inconvenient.

To solve some of the problems associated with a concealed primary user interface 142, some two-piece wireless communication devices 100 position the secondary user interface 144 so that is accessible when movable cover 102 is closed. These secondary user interfaces 144 typically either supplement the primary user interface 142, as shown in FIGS. 1A and 1C, or simply represent a reduced function interface relative to the primary user interface 142, as shown in FIG. 1B. In either case, while secondary user interface 144 is accessible to the user when the movable cover 102 is closed, the secondary user interface 144 may not provide access to some desired functions. For example, some wireless communication device functions, such as voicemail functions, require access to a keypad that executes dual-tone multiple frequency (DTMF) signals. Because the secondary user interface 144 does not provide access to the keypad or to functions controlled by the keypad, the secondary user interface 144 is inadequate for executing DTMF commands. The present invention addresses this problem by mapping a soft key on secondary user interface 144 to a selected function assigned to a control of primary user interface 142, as discussed further below.

For simplicity, the following describes the present invention in terms of voicemail functions and a voicemail operating mode. However, those skilled in the art will appreciate that the present invention is not so limited. The present invention also applies to other functions and operating modes that require access to specific keys or controls on primary user interface 142. For example, a mapped soft key 106 may alternatively provide access to information system, i.e., banking system, commands.

The secondary user interface 144 of the present invention includes one or more soft keys 106. When the movable cover 102 is closed, the wireless communication device maps each soft key 106 to a function 108 assigned to a selected control of the primary user interface 142. When movable cover 102 is open, soft key 106 implements any function 108 normally reserved for the controls of the secondary user interface 144, i.e., menu system functions.

Figure 2:
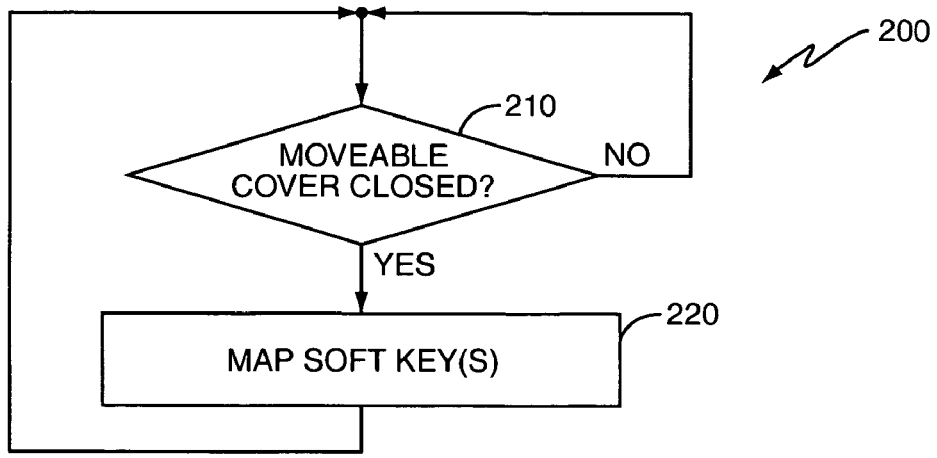
FIG. 2 illustrates one exemplary method for implementing the mapping process of the present invention.

FIG. 2 illustrates one exemplary mapping process 200 according to the present invention. While movable cover 102 is closed (block 210), wireless communication device 100 maps one or more soft keys 106 to one or more functions assigned to selected controls of the concealed primary user interface 142 (block 220).

Wireless communication device 100 maps the soft keys 106 to the functions 108 based on any number of variables. In one exemplary embodiment, the user may program the wireless communication device 100 using the primary and/or secondary user interfaces 142, 144 to map the soft keys 106 to user-selected functions 108 based on user preference. For example, a user may program the wireless communication device 100 to map a soft key 106 to a "delete" function. Based on the user-defined settings, wireless communication device 100 then maps soft key 106 to the "delete" function 108 when the movable cover 102 is closed.

Figure 3:
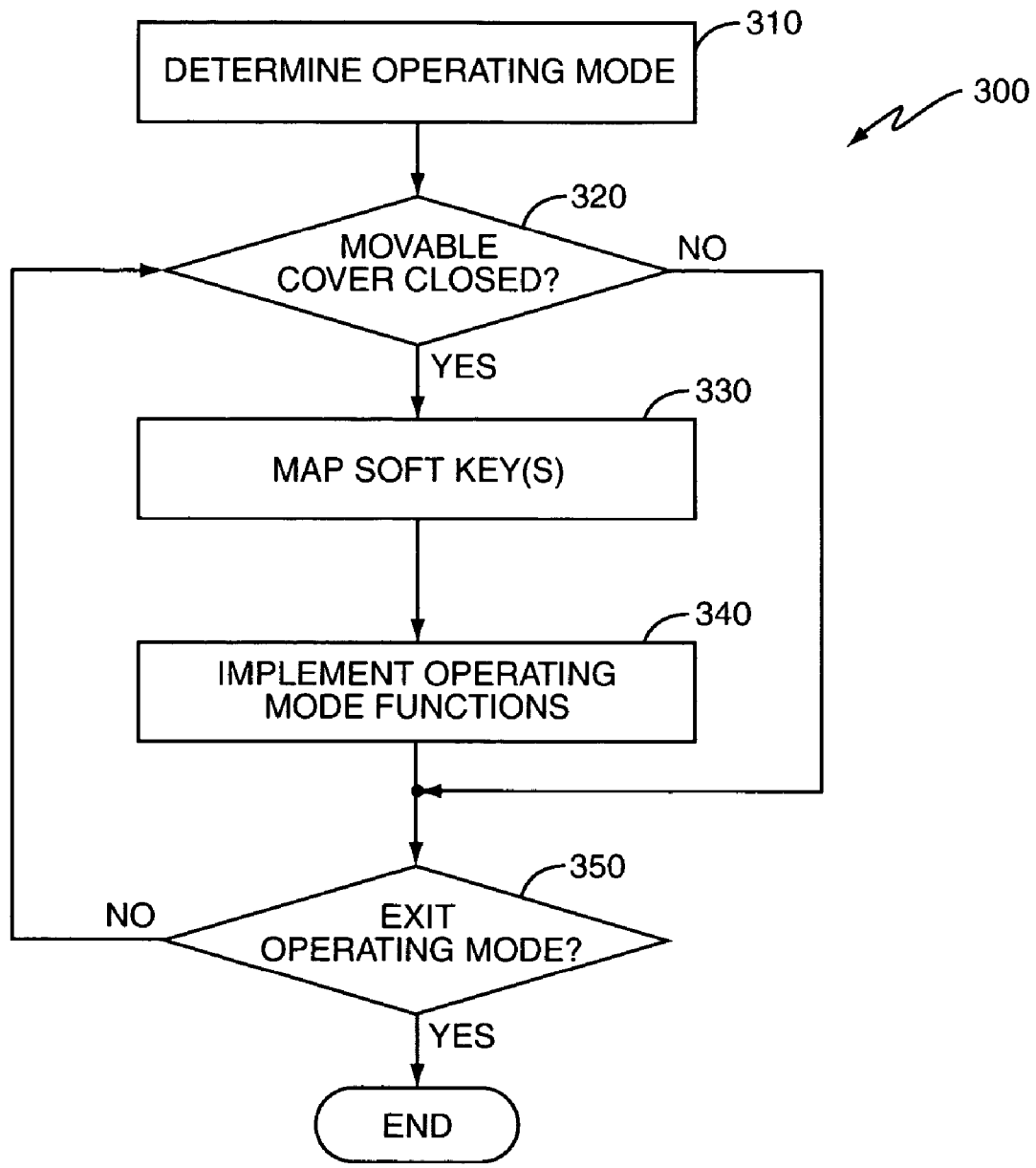
FIG. 3 illustrates another exemplary method for implementing the mapping process of the present invention.

According to another embodiment, wireless communication device 100 maps soft keys 106 to specific functions 108 based on the operating mode of wireless communication device 100, as illustrated by the process 300 shown in FIG. 3. According to this embodiment, after determining the operating mode (block 310), wireless communication device 100 determines if movable cover 102 is closed (block 320). While movable cover 102 is closed, wireless communication device 100 maps soft keys 106 to one or more functions 108 based on the operating mode (block 330). For example, when the wireless communication device 100 determines that movable cover 102 is closed and that wireless communication device 100 is operating in a voicemail mode, wireless communication device 100 maps one or more soft keys 106 to one or more voicemail functions 108, i.e., delete, skip, play, save, replay, etc., assigned to selected alphanumeric keys of the primary user interface 142. Wireless communication device 100 then implements mode-specific functions responsive to the user activating one or more soft keys 106 on the secondary user interface 144 (block 340). This process continues until wireless communication device 100 exits the operating mode (block 350).

Figure 4:
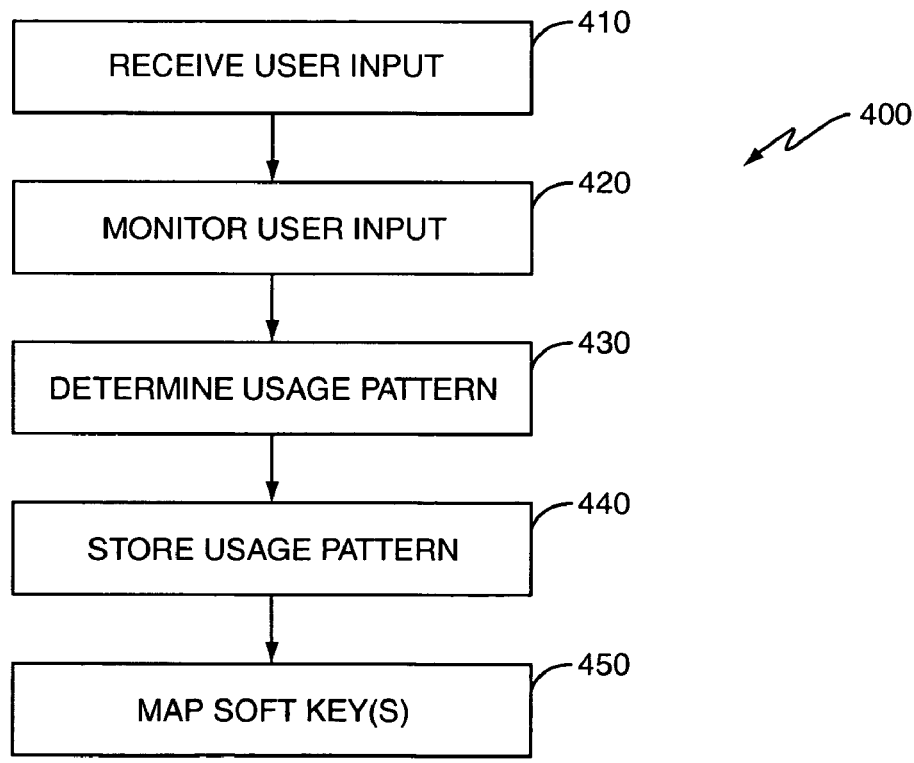
FIG. 4 illustrates another exemplary method for implementing the mapping process of the present invention.

In another exemplary embodiment, wireless communication device 100 maps soft keys 106 to specific functions 108 based on a usage pattern, as illustrated by the process 400 shown in FIG. 4. A usage pattern represents a pattern of behavior exhibited over time by the user during different operating modes. Wireless communication device 100 determines the usage pattern by monitoring how often and under what circumstances the user implements different functions. According to one exemplary method 400, wireless communication device 100 receives user input (block 410) and monitors which functions the user implements during different operating modes (block 420). Based on this information, wireless communication device 100 generates the usage pattern (block 430) and stores the usage pattern in memory (block 440). When the movable cover 102 is closed, wireless communication device 100 maps soft keys 106 to functions 108 based on the stored usage pattern (block 450). For example, when the user implements the delete function 75% of the time, the save function 5% of the time, and the skip function 20% of the time while in the voicemail mode, wireless communication device 100 stores this usage pattern in memory. Then, when movable cover 102 is closed, wireless communication device 100 maps one soft key 106 to the delete function 108 and another soft key 106 to the skip function responsive to the stored usage pattern.

According to another exemplary method 400, wireless communication device 100 may determine the usage pattern by monitoring which functions are implemented by the user during different phases or stages of an operating mode (blocks 420 and 430). When the movable cover 102 is closed, wireless communication device 100 maps soft keys 106 to functions 108 based on the usage pattern determined for the different phases of the operating mode (block 450). For example, when a user first enters a voicemail operating mode, the user may activate a play function 80% of the time and a skip function 20% of the time. However, after listening to a message, the user may activate a delete function 60% of the time and a save function 40% of the time. Based on this usage pattern, wireless communication device 100 maps a soft key 106 to a play function 108 during an initial phase of the voicemail operating mode, and to a delete function during a later phase of the voicemail operating mode when movable cover 102 is closed. As such, the stored usage pattern according to this embodiment not only depends on the particular operating mode, but also depends on the phase or stage of the operating mode.

According to still another exemplary embodiment, wireless communication device 100 may evaluate audio options presented to a user and map one or more soft keys 106 to one or more of the presented options. For example, if audio options presented by an automated system say, "To repeat, press 1," the wireless communication device 100 may interpret the audio options and map a soft key 106 to a repeat function labeled "Repeat, 1." In one embodiment, mapping processor 152 may interpret the audio options and map the soft key 106.

The above describes mapping a soft key 106 to a single function 108. However, the present invention is not so limited. According to one exemplary embodiment, wireless communication device 100 may map a soft key 106 to multiple functions assigned to selected controls of primary user interface 142. In this embodiment, the user may activate another control on secondary user interface 144 to step through the multiple functions 108 available to a single soft key 106. When the user locates the desired function 108, the user implements the function 108 by activating the soft key 106.

Figure 5:
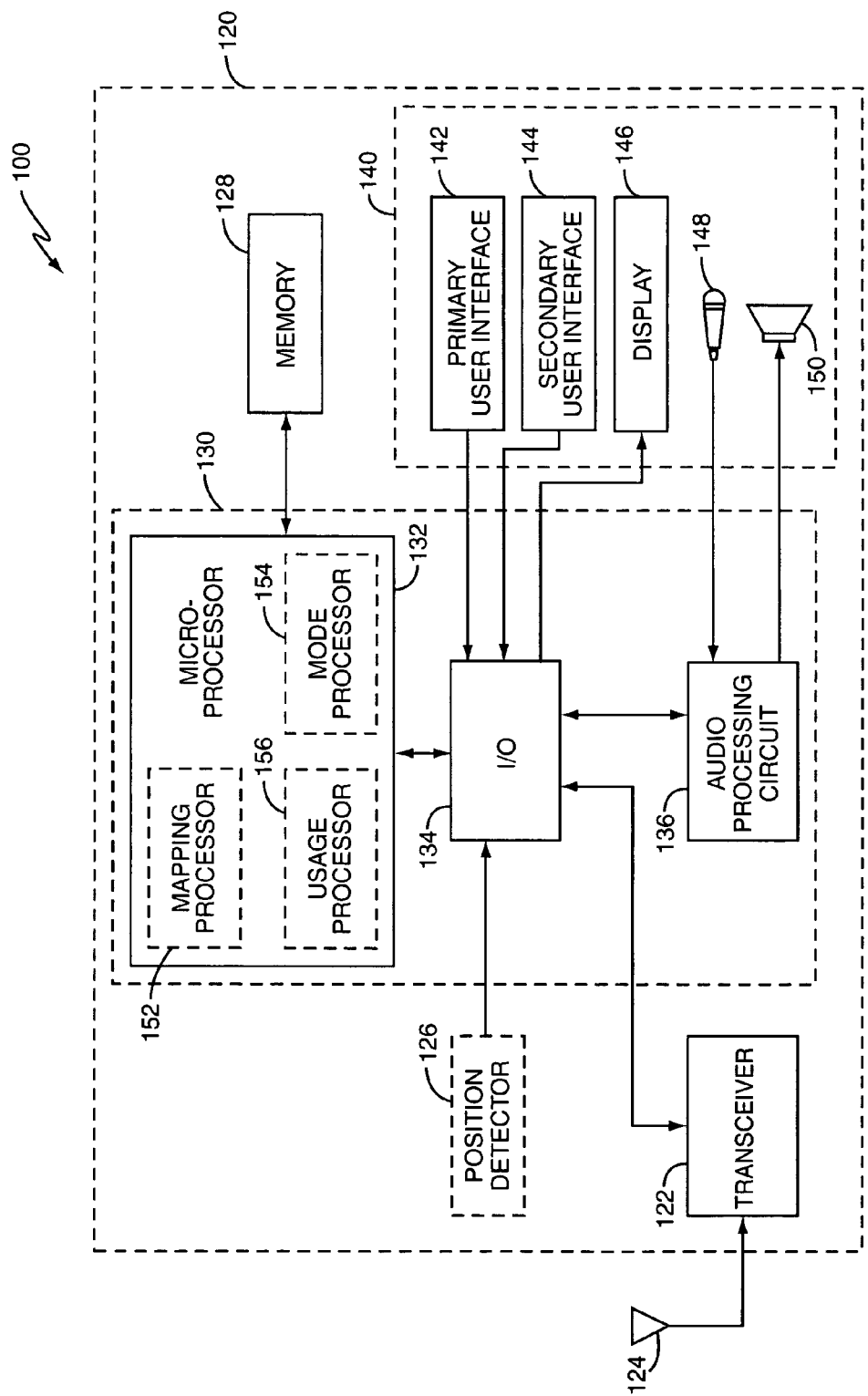
FIG. 5 illustrates a block diagram of one exemplary wireless communication device according to the present invention.

FIG. 5 illustrates one exemplary block diagram of a wireless communication device 100 for implementing the above-described processes of the present invention. Wireless communication device 100 comprises an antenna 124 and a communication circuit 120. Antenna 124 transmits and receives radio signals according to any means known in the art. Communication circuit 120 comprises input/output circuit 134, transceiver 122, position detector 126, memory 128, microprocessor 132, audio processing circuit 136, and user interface 140. Input/output circuit 134 interfaces microprocessor 132, transceiver 122, audio processing circuit 136, and user interface 140 according to any means known in the art. Transceiver 122, coupled to antenna 124, is a fully functional cellular radio transceiver, which may operate according to any known standard, including the standards known generally as the Global System for Mobile Communications (GSM), TDMA, TIA/EIA-136, cdmaOne, cdma2000, UMTS, and Wideband CDMA.

User interface 140 includes primary user interface 142, secondary user interface 144, display 146, microphone 148, and speaker 150. Display 146 allows the user to see dialed digits, images, called status, menu options, and other service information, including soft key commands. Microphone 148 converts the user's speech into electrical audio signals, while speaker 150 converts electrical audio signals, such as speech signals from a far-end user, into audible signals that can be heard by the user. Microphone 148 and speaker 150 interface with audio processing circuit 136, which processes the audio signals according to means well known in the art.

Primary user interface 142 enables the user to dial numbers, enter commands, and select options via an alphanumeric keypad when the movable cover 102 is open, as known in the art. While not explicitly shown, primary user interface 142 may include other controls and/or a navigation control, such as a joystick control. Secondary user interface 144 enables the user to enter commands and select options via a select number of keys, controls, and/or a navigation control, such as a joystick control. As discussed above, secondary user interface 144 is accessible when the movable cover 102 is closed and conceals at least a portion of the primary user interface 142. In addition, secondary user interface 144 may also be accessible when the movable cover 102 is open, as shown in FIGS. 1A-1C.

Microprocessor 132 controls the operation of mobile communication device 100 according to programs stored in memory 128. The control functions of microprocessor 132 may be implemented in a single microprocessor or in multiple microprocessors. Suitable microprocessors may include, for example, both general purpose and special purpose microprocessors and digital signal processors. Memory 128 represents the entire hierarchy of memory in a mobile communication device 100, and may include both random access memory (RAM) and read-only memory (ROM). Computer program instructions and data required for operation are stored in non-volatile memory, such as EPROM, EEPROM, and/or flash memory, which may be implemented as discrete devices, stacked devices, or integrated with microprocessor 132. As shown in FIG. 5, microprocessor 132, input/output circuit 134, and/or audio processing circuit 136 may be incorporated into a specially designed application-specific integrated circuit (ASIC) 130. While not shown, ASIC 130 may also include position detector 126 and/or memory 128.

According to the present invention, microprocessor 132 includes a mapping processor 152. Mapping processor 152 maps the soft keys 106 of secondary user interface 144 to functions 108 assigned to selected controls of primary user interface 142 when movable cover 102 is closed. For example, mapping processor 152 may map two soft keys 106 to delete and save functions 108, respectively, assigned to selected numeric keys of primary user interface 142. Upon activation of a soft key 106, microprocessor 132 executes the function 108 mapped to soft key 106.

As discussed above, mapping processor 152 maps the soft keys 106 to functions 108 based on any number of variables. In one embodiment, the user may program wireless communication device 100 to map the soft keys 106 to specific functions 108 based on user preference. According to another embodiment, mapping processor 152 maps the soft keys 106 to specific functions 108 based on the operating mode of the wireless communication device 100. To that end, microprocessor 132 may also include a mode processor 154 for determining the operating mode of wireless communication device 100 based on user input and/or operational settings within microprocessor 132. In another exemplary embodiment, mapping processor 152 may map the soft keys 106 to specific functions 108 based on a usage pattern determined by a usage processor 156 according to any of the methods discussed above.

While FIG. 5 shows that microprocessor 132 includes mapping processor 152, mode processor 154, and usage processor 156, those skilled in the art will appreciate that the present invention does not require this configuration. One or more of these processors 152, 154, 156 may be implemented in separate microprocessors. Further, one or more of these processors 152, 154, 156 may be implemented by a single processor. Further still, the present invention does not require that wireless communication device 100 include each of the mapping, mode, and usage processors 152, 154, 156. As such, the present invention is not limited to the specific configuration illustrated by FIG. 5.

As discussed above, mapping processor 152 maps soft keys 106 to selected functions 108 when movable cover 102 is closed. Therefore, wireless communication device 100 may also include position detector 126, as shown in FIG. 5, to detect the position of movable cover 102 relative to main body 104. Position detector 126 may detect the position of movable cover 102 according to any known means. For example, position detector 126 may comprise a spring-loaded device that indicates a closed position when the device is compressed. Alternatively, position detector 126 may detect a position of hinge 103 or other rotation or pivot member of wireless communication device 100 to determine when movable cover 102 is closed. In any event, detecting the position of movable covers relative to a main body is well known, and therefore, will not be discussed further herein.

Figure 1D:
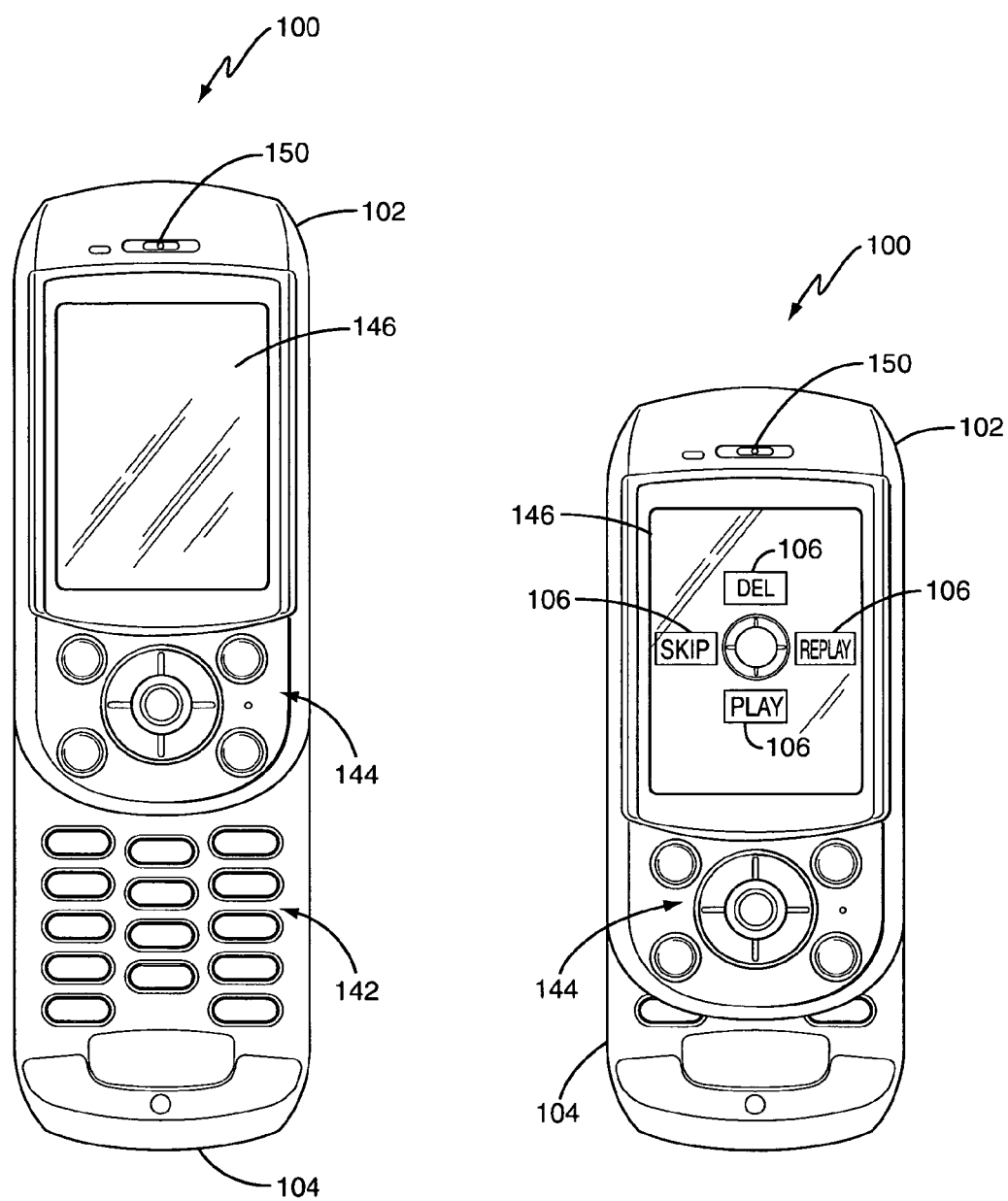
FIG. 1D illustrates another slider type wireless communication device showing an exemplary soft key implementation according to the present invention.

The above describes how wireless communication device 100 maps soft keys 106 on a secondary user interface 144 to specific functions 108 normally assigned to controls of a primary user interface 142. As shown in FIGS. 1A-1C, soft keys 106 may be disposed anywhere on the movable cover 102 proximate a display 146, including along a side of movable cover 102, as shown in FIG. 1B. Alternatively, soft keys 106 may be implemented as part of a display 146 having touch-screen capabilities, where a user touches the displayed function label to implement the desired function, as shown in FIG. 1C. In still another exemplary embodiment, soft key options may be displayed on display 146 and controlled or implemented by a multi-direction control, such as a joystick on user interface 144, as shown in FIG. 1D. In the illustrated example, pushing up on the joystick implements a delete option 106, while pushing down on the joystick implements a play option 106. In any event, soft keys 106 provide access to various functions 108 typically reserved for the controls of the primary user interface 142 while the movable cover 102 is closed.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of providing an improved user interface for a wireless communication device having a main body and a movable cover, the method comprising: providing a first control on a first user interface, wherein the first control is associated with a first function when the movable cover is in an open position relative to the main body, and wherein said first control is inaccessible when the movable cover is in a closed position relative to the main body; providing a soft key on a second user interface, wherein the soft key is accessible when the movable cover is in both the open position and the closed position; mapping the soft key to the first function when the movable cover is in the closed position; and mapping the soft key to a different second function when the movable cover is in the open position; and implementing the first function responsive to an activation of the soft key when the movable cover is in the closed position, and implementing the first function responsive to an activation of the first control when the movable cover is in an open position relative to the main body.

2. The method of claim 1 wherein mapping the soft key to the first function comprises mapping the soft key to the first function based on a usage pattern.

3. The method of claim 1 wherein mapping the soft key to the first function comprises mapping the soft key to the first function based on an identified operating mode.

4. The method of claim 1 wherein mapping the soft key to the first function comprises mapping the soft key to the first function based on interpreted audio options.

5. The method of claim 1 wherein mapping the soft key to the first function comprises mapping the soft key to a voicemail function assigned to the first control.

6. The method of claim 1 wherein mapping the soft key to the first function comprises mapping the soft key to a menu of functions assigned to the first control of the first user interface.

7. The method of claim 1 wherein the first user interface comprises a keypad and the first control comprises a selected key on the keypad, and wherein mapping the soft key to the first function comprises mapping the soft key to the first function assigned to the selected key of the keypad.

8. A wireless communication device comprising: a main body; a movable cover connected to the main body; a first user interface including a first control, wherein the first control is associated with a first function when the movable cover is in an open position relative to the main body, and wherein said first control is inaccessible when the movable cover is in a closed position relative to the main body; a second user interface including a soft key, wherein the soft key is accessible when the movable cover is in both the open position and the closed position relative to the main body; and a mapping processor operatively connected to the second user interface, said mapping processor configured to map the soft key to the function assigned when the movable cover is in the closed position, and to map the soft key to a different second function when the movable cover is in the open position; wherein the wireless communication device is configured to implement the first function responsive to an activation of the soft key when the movable cover is in the closed position, and configured to implement the first function responsive to an activation of the first control when the movable cover is in an open position relative to the main body.

9. The wireless communication device of claim 8 further comprising a usage processor configured to determine a usage pattern, wherein the mapping processor is configured to map the soft key to the first function based on the usage pattern.

10. The wireless communication device of claim 8 further comprising a mode processor configured to identify an operating mode of the wireless communication device, wherein the mapping processor is configured to map the soft key to the first function based on the identified operating mode.

11. The wireless communication device of claim 8 wherein the first function comprises a voicemail function.

12. The wireless communication device of claim 8 wherein the first user interface comprises a keypad and the first control comprises a selected key on the keypad, and wherein the mapping processor is configured to map the soft key to the first function assigned to the selected key of the keypad.

13. The wireless communication device of claim 8 wherein the first user interface is disposed on the main body.

14. The wireless communication device of claim 8 wherein the second user interface is disposed on the movable cover.

* * * * *